United States Patent
Anganes

(10) Patent No.: US 8,375,847 B1
(45) Date of Patent: Feb. 19, 2013

(54) WINCH FOR TURKEY DEEP FRYERS

(76) Inventor: William P. Anganes, Stockton, CA (US)

( * ) Notice: Subject to any disclaimer, the term of this patent is extended or adjusted under 35 U.S.C. 154(b) by 994 days.

(21) Appl. No.: 12/315,455

(22) Filed: Dec. 3, 2008

Related U.S. Application Data

(60) Provisional application No. 61/004,948, filed on Dec. 3, 2007.

(51) Int. Cl.
*A47J 37/12* (2006.01)
*B66D 1/60* (2006.01)

(52) U.S. Cl. ............... 99/407; 99/410; 99/411; 99/412; 99/413; 99/414; 99/415; 254/264; 254/266; 452/185; 126/25 A; 126/25 AA

(58) Field of Classification Search ............... 99/407, 99/410–415; 254/264, 266; 452/185; 126/25 A, 126/25 AA
See application file for complete search history.

(56) References Cited

U.S. PATENT DOCUMENTS

| | | | | |
|---|---|---|---|---|
| 955,140 | A * | 4/1910 | Cronk | 126/30 |
| 1,214,104 | A * | 1/1917 | Wingire | 254/334 |
| 1,478,939 | A * | 12/1923 | Cavilla | 99/336 |
| 1,679,461 | A * | 8/1928 | Worsching | 248/188.9 |
| 2,367,448 | A * | 1/1945 | Thiele | 99/409 |
| 3,300,186 | A * | 1/1967 | Lee | 254/334 |
| 3,585,050 | A * | 6/1971 | Singer et al. | 99/357 |
| 4,043,260 | A * | 8/1977 | LaPour et al. | 99/421 HH |
| 4,120,280 | A * | 10/1978 | Iverson et al. | 126/30 |
| 4,469,307 | A * | 9/1984 | Bell | 254/199 |
| 4,586,275 | A * | 5/1986 | Henry et al. | 37/227 |
| 4,860,404 | A * | 8/1989 | Flachs | 452/187 |
| D315,846 | S * | 4/1991 | Hatzenbeller | D7/335 |
| 5,016,300 | A * | 5/1991 | Jandrakovic | 5/85.1 |
| 5,025,715 | A * | 6/1991 | Sir | 99/421 HV |
| 5,211,601 | A * | 5/1993 | Cope | 452/187 |
| D337,933 | S * | 8/1993 | Gryz | D7/332 |
| 5,297,534 | A * | 3/1994 | Louden | 126/30 |
| 5,469,778 | A * | 11/1995 | Prudhomme | 99/336 |
| 5,564,328 | A * | 10/1996 | Huang | 99/337 |
| 5,603,488 | A * | 2/1997 | O'Rourke et al. | 254/334 |
| 5,850,829 | A * | 12/1998 | Taylor et al. | 126/30 |
| 5,908,026 | A * | 6/1999 | Forst | 126/25 AA |
| 5,931,085 | A * | 8/1999 | Benzschawel | 99/449 |
| 5,970,852 | A | 10/1999 | Bourgeois | |
| 6,059,266 | A * | 5/2000 | Ascherin et al. | 254/334 |
| 6,240,915 | B1 * | 6/2001 | Fletcher, Sr. | 126/276 |
| 6,314,869 | B1 * | 11/2001 | Bourgeois, Jr. | 99/340 |
| 6,327,967 | B1 * | 12/2001 | Pei | 99/339 |
| 6,554,254 | B2 * | 4/2003 | Vetesnik | 254/325 |
| 6,685,170 | B1 * | 2/2004 | Gwynn | 254/325 |
| 6,698,335 | B1 * | 3/2004 | Bourgeois | 99/340 |
| 6,711,992 | B1 * | 3/2004 | McLemore | 99/413 |
| 6,711,993 | B2 * | 3/2004 | Robertson | 99/448 |
| 6,994,618 | B1 * | 2/2006 | Syers | 452/187 |

(Continued)

*Primary Examiner* — Gene Kim
*Assistant Examiner* — Alexander Niconovich
(74) *Attorney, Agent, or Firm* — Montgomery Patent & Design; Robert C. Montgomery

(57) ABSTRACT

A mechanical apparatus that lowers and raises a turkey, or similar food item, into a large fry pot is herein disclosed. The apparatus has a vertically-adjustable tripod stand that is positioned over the top center of a fry pot. A manual cranking mechanism lowers and raises a steel cable having a grasping hook at the distal end. Additionally, the steel cable can have a basket at its distal end. In operation, the turkey to be fried is placed thereon the hook or therein the metal basket. Then, with the user a safe distance removed, the crank lowers the food into the hot oil in a controlled manner. When the food has finished cooking, the cranking mechanism is reversed to raise the food from the fryer. The apparatus may also be provided having an alternate electric-powered winch.

29 Claims, 8 Drawing Sheets

U.S. PATENT DOCUMENTS

| | | | | |
|---|---|---|---|---|
| 7,059,956 B1 * | 6/2006 | Summerlin | | 452/192 |
| 7,140,362 B1 * | 11/2006 | Johnston | | 126/25 A |
| 7,244,173 B2 * | 7/2007 | Lake | | 452/128 |
| 7,261,631 B1 * | 8/2007 | Golson, Sr. | | 452/187 |
| 7,464,640 B2 * | 12/2008 | Vasquez | | 99/407 |
| D599,166 S * | 9/2009 | Knypstra et al. | | D7/403 |
| 7,806,755 B1 * | 10/2010 | Martinelli et al. | | 452/187 |
| 7,980,241 B1 * | 7/2011 | White | | 126/30 |
| 2002/0094744 A1 * | 7/2002 | Cheng | | 446/15 |
| 2006/0144246 A1 * | 7/2006 | Holliday | | 99/403 |
| 2006/0283335 A1 * | 12/2006 | Vasquez | | 99/403 |
| 2008/0044537 A1 * | 2/2008 | Manuel | | 426/523 |
| 2008/0277558 A1 * | 11/2008 | Litwin et al. | | 248/637 |

* cited by examiner

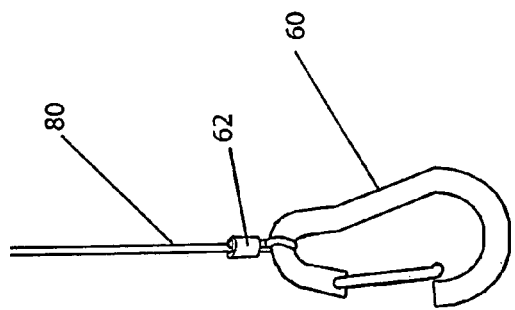
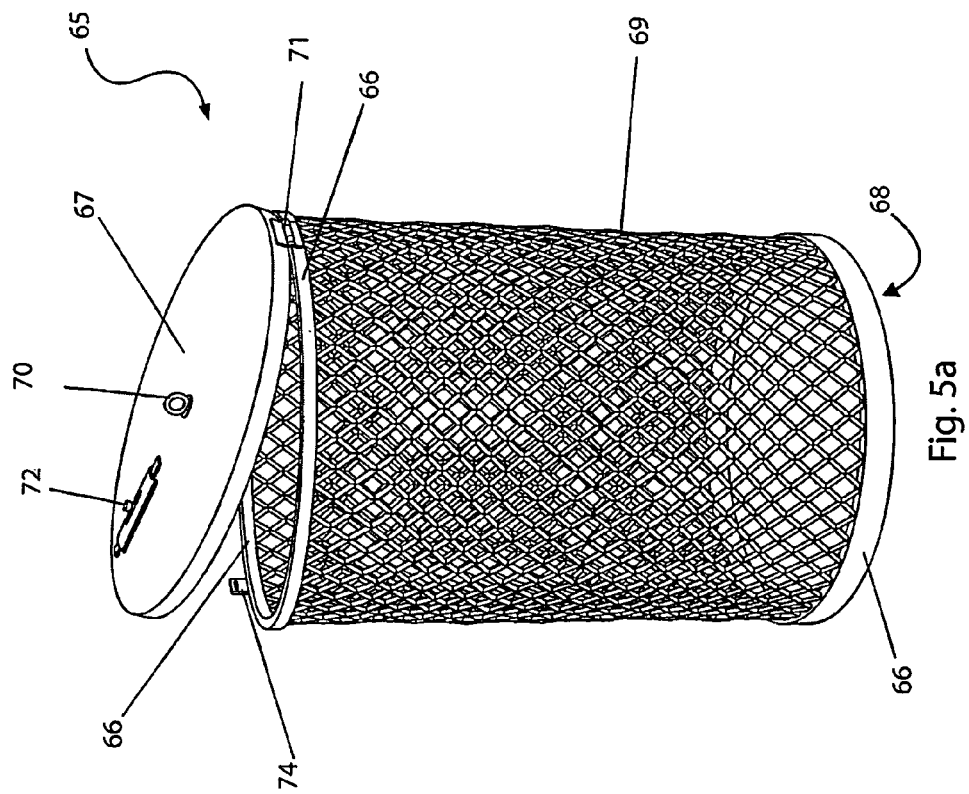

WINCH FOR TURKEY DEEP FRYERS

RELATED APPLICATIONS

The present invention was first described in U.S. Provisional Patent Application No. 61/004,948 filed on Dec. 3, 2007, the entire disclosures of which are incorporated herein by reference.

FIELD OF THE INVENTION

The present invention relates generally to an apparatus enabling a user to attach foodstuffs to a winch mechanism mounted thereon a tripod stand above a cooking vessel and to manually or automatically raise or lower said foodstuffs thereinto said cooking vessel in a safe, effective, and easy manner.

BACKGROUND OF THE INVENTION

The use of large, propane-fired deep fryers has blossomed in recent years. These deep fryers provide a new way to prepare turkeys, seafood, and other food products in a manner that many people enjoy. These fryers are not without their hazards. Accidental fires have been caused by these fryers creating blazes which cannot only destroy a home but take lives as well. One of the most common scenarios that lead to a fire is when food is first placed into the hot oil. As often happens, the oil will begin to sputter and splash which may burn the user and cause him or her to drop the food the rest of the way. This may cause the oil to overflow where it runs down the side of the pot and comes into contact with the open gas flame. The resultant ignition then travels back up the side of the pot where it ignites the entire pot as well, forming a large fireball. Another issue with these fry pots is that it is exceedingly difficult to get the food back out, especially when food item is heavy as is the case with a turkey. Accordingly, there is a need for a means by which the above-mentioned disadvantages of using a deep fryer can be addressed. The development of the invention herein described fulfills this need.

There have been attempts in the past to invent devices to make the use of large, propane fired deep fryers safer. U.S. Pat. No. 6,698,335 issued to Bourgeois discloses a gas fired cooking apparatus that appears to comprise a burner that appears to encompass a cooking vessel with a valved flowline that enables a user to drain away any fluid that is used for cooking. Unfortunately, this patent does not appear to disclose a winch for a deep fryer that comprises a winch mechanism incorporated into several leg assemblies that surround a deep fryer and enable a user to safely and easily place and remove foodstuffs into a deep fryer.

U.S. Pat. No. 6,314,869 issued to Bourgeois discloses an outdoor cooking apparatus that appears to comprise a cooking vessel with a food holder that can be placed inside the cooking vessel and manipulated with a handle. Unfortunately, this patent likewise does not appear to disclose a winch mechanism that can be utilized to insert and remove foodstuffs safely into a deep fryer.

U.S. Pat. No. 6,240,915 issued to Fletcher comprises a mobile fryer and steamer cooking apparatus that appears to comprise a trailer-mounted cooking apparatus that includes frying and steaming surfaces for preparing food. Unfortunately, this patent does not appear to disclose a winch for a turkey deep fryer.

U.S. Pat. No. 5,970,852 issued to Bourgeois discloses a gas fired outdoor cooking apparatus similar to U.S. Pat. No. 6,698,335. Unfortunately, this patent like the previously cited patent does not appear to disclose a winch for a deep fryer that comprises a winch mechanism incorporated into several leg assemblies that surround a deep fryer and enable a user to safely and easily place and remove foodstuffs into a deep fryer.

U.S. Pat. No. 5,469,778 issued to Prudhomme discloses a fryer basket lift that appears to comprise an apparatus for raising and lowering cooking baskets along a guide track. Unfortunately this patent does not appear to disclose a winch mechanism that can be utilized to insert and remove foodstuffs safely into a deep fryer.

U.S. Pat. No. 1,478,939 issued Cavilla discloses what appears to be a commercial egg boiler apparatus. Unfortunately, this patent does not appear to disclose a winch mechanism that is attached to several leg assemblies that encompass a turkey deep fryer.

SUMMARY OF THE INVENTION

In light of the disadvantages as described in the prior art, it is apparent that there is a need for a winch apparatus that optionally lowers and raises variously sized food items into a large fry pot.

An object of the winch for a turkey deep fryer comprises a fabrication of rugged metallic materials such as stainless steel or aluminum having sufficient strength and capable of functioning in a wide temperature range.

Another object of the winch for a turkey deep fryer comprises a standard accessory on fryers and may be provided as an add-on for existing fryers.

A further object of the winch for a turkey deep fryer provides a means by which a person can fry turkey, chicken, or similar foodstuffs in an efficient manner while reducing a risk of hot frying oil being splattered causing injury of a fire.

Still another object of the winch for a turkey deep fryer supported around a periphery of a flyer with vertically adjustable leg assemblies.

Still a further object of the winch for a turkey deep fryer provides a wire frame or meshed basket that enables effective draining of residual cooking oil while retaining the foodstuff therein.

Yet another object of the winch for a turkey deep fryer permits a user to lower and raise foodstuff in a deep fryer with a minimal amount of work and/or handling, while keeping the user at a safe distance from the hazards associated with a deep fryer.

Yet a further object of the winch for a turkey deep fryer is a guide that provides control of the cable and guards against hot frying oil splattering upward toward a user.

Still a further object of the winch for a turkey deep fryer comprises various sizes such as small, medium, and large, thereby allowing frying of various foodstuff such as, but not limited to: small frying jobs such as chicken wings and fries, as well as large frying jobs such as one (1) or more turkeys and/or chickens.

Yet still a further object the winch for a turkey deep fryer features an adjustability means within the leg assemblies that allows for selectable upward or downward movement to regulate the height of the winch with a height of the fryer, the type of foodstuff to be fried, and/or other user preferences.

An aspect of the winch for a turkey deep fryer comprises a tripod stand comprising three (3) leg assemblies interconnected with a plurality of horizontal connecting bars and providing a height-adjustable stabilizing means over a desired fryer. The leg assemblies are spaced so as to substantially surround a fryer and allow connecting bars to partially envelope and secure the fryer.

A further aspect of the winch for a turkey deep fryer comprises connecting bars comprising an upper stiffener bar and a pair of intermediate connecting bars to provide enhanced stiffness and resist structural deflection due to the weight of the foodstuffs.

Still a further aspect of the winch for a turkey deep fryer comprises a leg locking mechanism to control the availability of an overall length of said leg assemblies.

Yet still a further aspect of the winch for a turkey deep fryer comprises an extendable section comprising an attachable stabilizing foot at a proximal end for improved stability on grounds of various grades. The stabilizing foot comprises a common orbital footpad feature.

Yet another aspect of the winch for a turkey deep fryer comprises a guide comprising a flat circular disc comprising a center aperture therein allowing a steel cable to slidingly travel located at an upper portion thereof the tripod stand. The guide also provides a splash guard function and prevents hot frying oil from splashing or spraying upwardly. The guide further prevents the basket or hook when in motion from rocking, swinging, or motioning undesirably.

Yet a further aspect of the winch for a turkey deep fryer comprises a winch mechanism comprising a winch mechanism housing, a winch, a cable, a handle, a stop collar, a pulley, a rotating bar, a stop bar and a stop block. The winch mechanism functions as a means to raise and lower the hook and/or basket relative to the fryer. The winch mechanism also comprises a winch locking mechanism further comprising a horizontally sliding metal plate which allows a user to manually secure a vertical incremental positioning of the foodstuff.

Yet still another aspect of the winch for a turkey deep fryer comprises a winch comprising a rotating bar within a winch mechanism housing further comprising a handle. The rotating bar comprises a cranking member providing an efficient manual torque means to an internal pulley and cable for manual raising and/or lifting of the foodstuff. The winch is mounted to a support plate via a pair of locking blocks thereat a top portion of the tripod stand.

Another aspect of the winch for a turkey deep fryer comprises a cable comprising a length of standard braded wire rope with a vertically adjustable stop collar affixed thereto. The stop collar is positioned so that the guide rests upon it. The foodstuffs to be fried are envisioned to be attached to the steel cable via a hook and/or a basket.

Still a further aspect of the winch for a turkey deep fryer comprises a basket comprising a cylindrical shape mesh container further comprising a basket frame, a top wall, a bottom mesh wall, a cylindrical side wall, an eyelet, a hasp, and a hasp receiver. The basket frame comprises a pair of parallel circular metal hoops and provides an attachment means to the bottom mesh wall and side wall. The top wall comprises a shallow cylindrical lid structure being hingedly and releasably locked to the basket frame.

Still another aspect of the winch for a turkey deep fryer comprises a top wall comprising a hinge, a hasp, a hasp receiver and an eyelet. The hasp comprises a standard hardware item affixed to the top wall comprising a sliding engagement bolt. The top wall further comprises a centrally located eyelet that provides an attachment means to the hook. The hook is similar in function and design to a large carabiner with a spring closure feature.

An aspect of the winch for a turkey deep fryer comprises an alternate motorized winch mechanism further comprising a removably detachable power cord, a male connector, a female connector, and an UP/DOWN switch, a motor and a motor shaft. The motorized winch mechanism provides an operator of the apparatus to initiate a lifting or lowering of the foodstuffs while standing at an increased distance from the fryer.

A method of utilizing the apparatus may be achieved by performing the following steps: positioning the apparatus upon a preferably flat surface or smooth grade; adjustably extending and/or retracting the extendable section portions of the leg assemblies in such a manner that the winch mechanism may be operably placed a certain distance above a desired fryer; locking the leg assemblies at the desirable height via the leg locking mechanisms; placing the apparatus around the desired fryer with the connecting bars and/or the leg assemblies partially enveloping said fryer; securing said foodstuff within the basket, if desired; mounting said basket, if desired, to the hook portion to operably secure the desired foodstuff; alternately securing said foodstuff directly to the hook, if desired; hingedly closing the top wall of the basket and securing with the hasp fully enclosing the foodstuff; disengaging the winch locking mechanism to releasably secure the foodstuff; gripping the handle portion of the rotating bar; motioning said handle in a rotating manner so as to lower the suspended foodstuff into a frying pot; securing a desired elevation of the foodstuff by manually inserting the winch locking mechanism against the stop block; commencing to perform a frying process for an appropriate time interval; once finished frying said foodstuff, removing the basket and contents in by releasing the winch locking mechanism; rotating the handle in an opposite direction, raising the basket and the contents; engaging the winch locking mechanism at a fully raised position; and, hingedly opening the top wall of said basket to allow the foodstuff in to be able to be collected for consumption or processing.

A method of utilizing the alternate motorized embodiment may be achieved by performing the following additional steps: connecting the female connector portion of the power cord to the male connector portion of the motor; supplying electric power to the motorized winch mechanism by plugging the power cord into an available electric outlet; initiating the motorized winch mechanism using the UP/DOWN switch; operating the motorized winch mechanism in conjunction with the winch locking mechanism as described above; manipulating the hook and/or basket to lift, lower, or retain an intermediate vertical position of using said UP/DOWN switch and motor.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5a is a perspective view of a basket 65, according to the preferred embodiment of the present invention;

FIG. 5b is a perspective view of a hook 60, according to the preferred embodiment of the present invention;

Figure 1A:
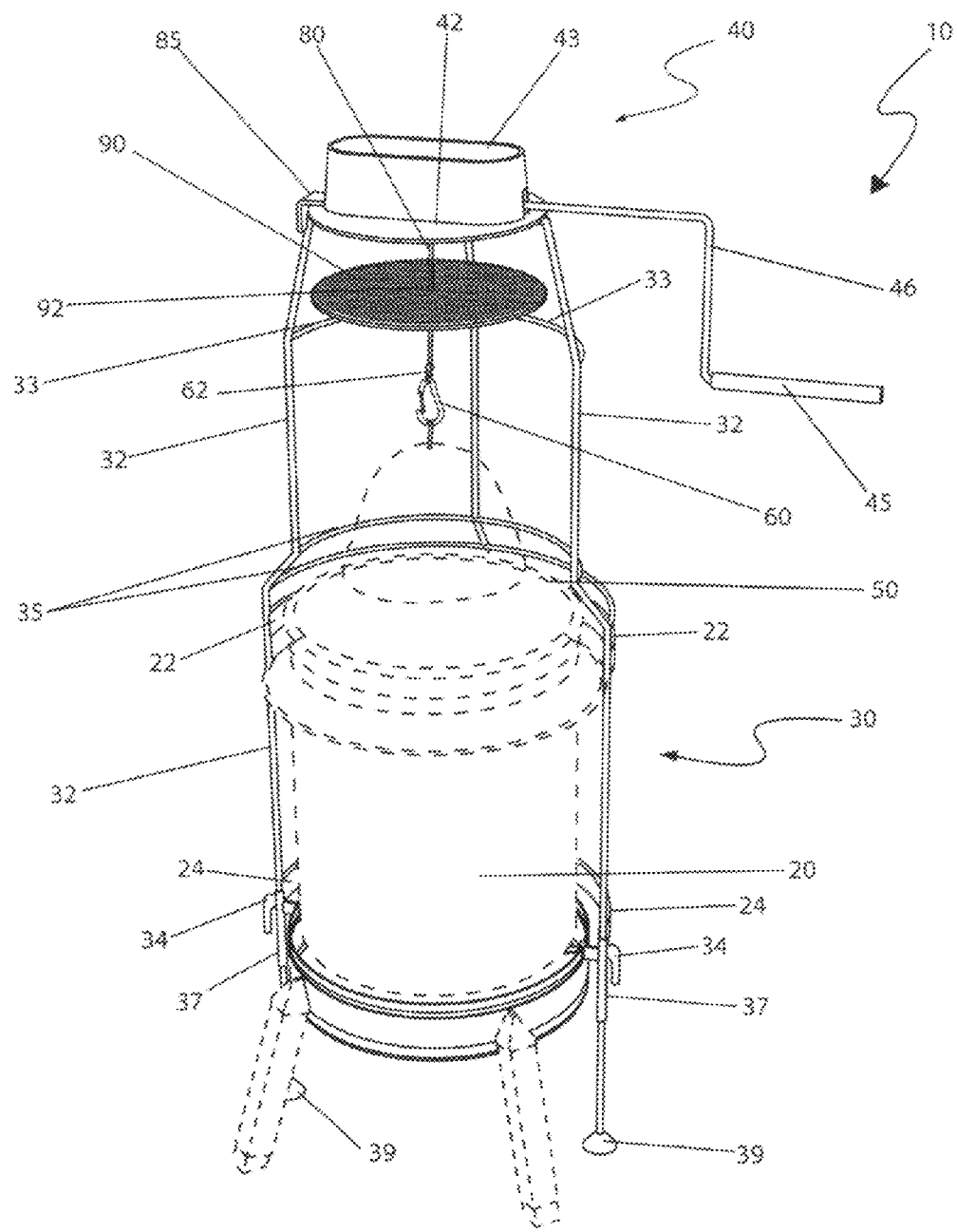
FIG. 1*a* is an environmental perspective view of a winch for turkey deep fryers 10 with a provision 50 operably attached thereto, according to the preferred embodiment of the present invention.

DESCRIPTIVE KEY 10 winch for turkey deep fryers
20 fryer
22 upper stiffener bar
24 lower stiffener bar
30 tripod stand
32 leg assembly
33 upper connecting bar
34 leg locking mechanism
35 intermediate connecting bar
36 threaded attachment
37 base section
38 extendable section
39 stabilizing foot
40 winch mechanism
41 bar aperture
42 support plate
43 winch mechanism housing
44 housing hinge
45 handle
46 rotating bar
48 pulley
49 stop block
50 provision
60 hook
62 cable fastener
65 basket
66 basket frame
67 top wall
68 bottom mesh wall
69 sidewall
70 eyelet
71 hinge
72 hasp
74 hasp receiver
80 cable
81 stop collar
85 winch locking mechanism
86 locking block
88 locking knob
90 guide
92 aperture
100 motorized winch mechanism
102 motor
103 motor shaft
104 power cord
106 male connector
107 female connector
108 UP/DOWN switch

DETAILED DESCRIPTION OF THE PREFERRED EMBODIMENT

Figure 6A:
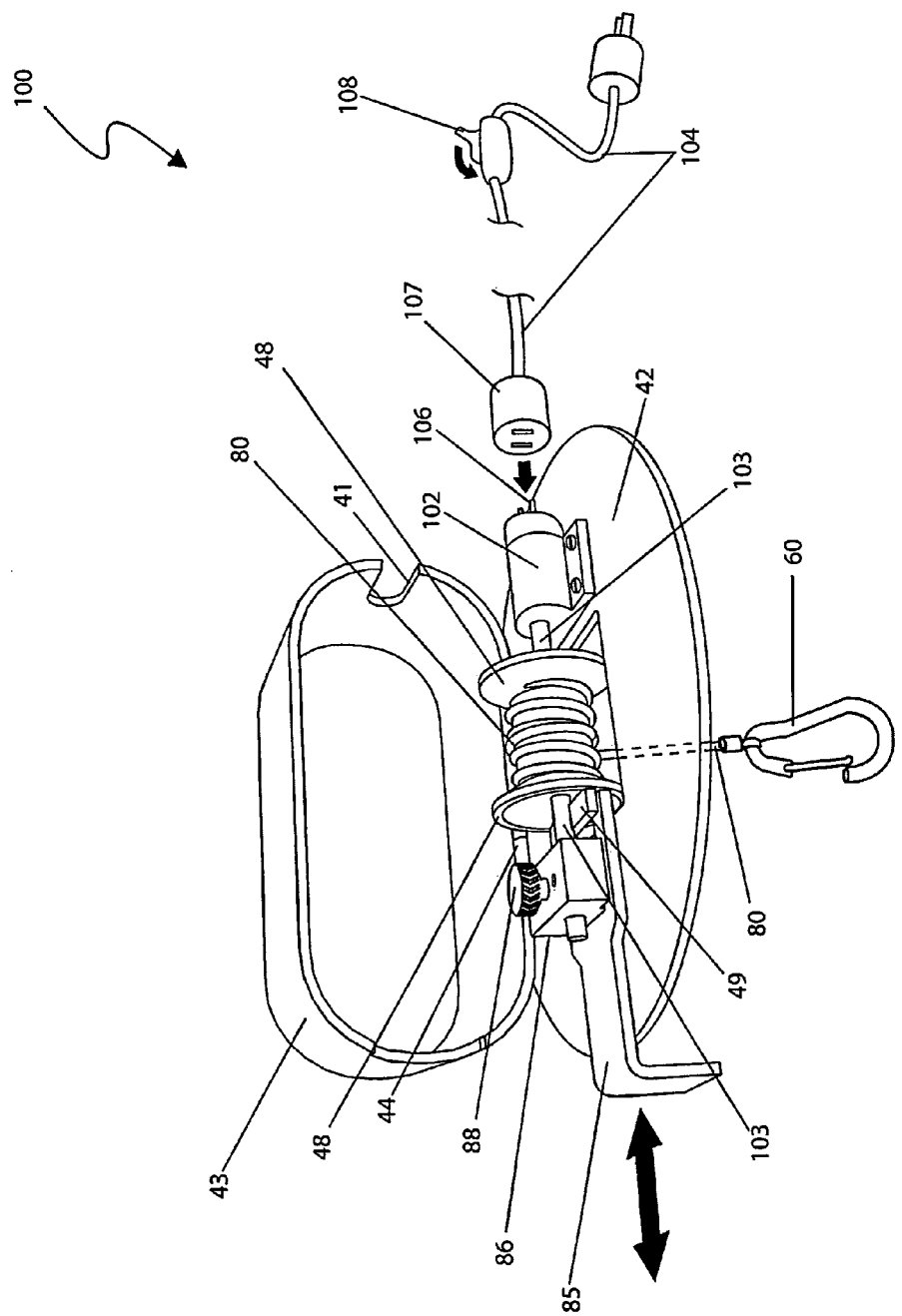
FIG. 6a is a close-up perspective view of an alternate motorized winch mechanism 100, according to an alternate embodiment of the present invention; and, FIG. 6b is an electrical block diagram of the alternate motorized winch mechanism 100, according to an alternate embodiment of the present invention.
Figure 6B:
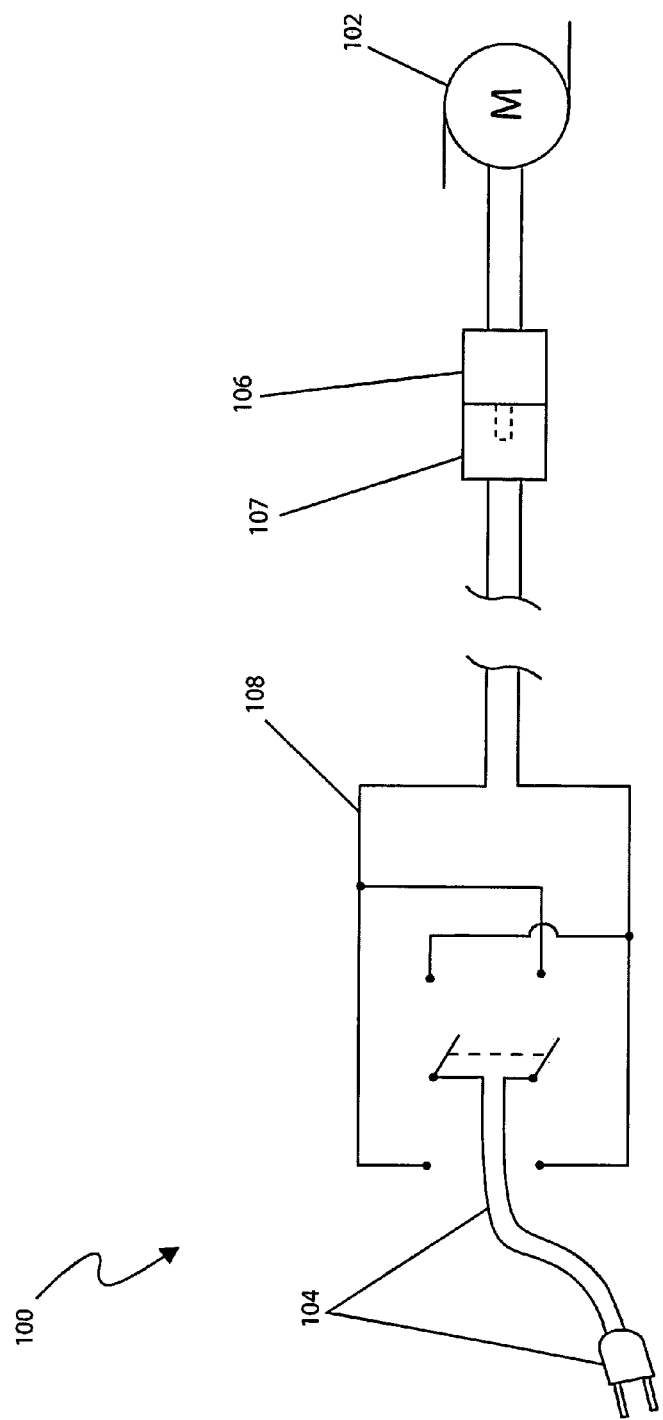

The best mode for carrying out the invention is presented in terms of its preferred embodiment, herein depicted within FIGS. 1 through 5 and in terms of an alternate motorized embodiment, herein depicted within FIGS. 6a and 6b. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a winch apparatus that optionally lowers and raises variously sized food items 50 thereinto a fry pot 20. The winch for deep fried turkeys (herein described as the "apparatus") 10 comprises a vertically adjustable tripod stand 30, a winch mechanism 40, a steel cable 80, a hook 60, and a basket 65 to grasp or contain food items 50 such as turkeys, chickens, or other foods (herein described as "provisions") 50. The apparatus 10 is envisioned to be fabricated of rugged metallic materials such as stainless steel or aluminum having sufficient strength and capable of functioning in a wide temperature range. The apparatus 10 may be readily available as a standard accessory on fryers 20 as well as be provided as an add-on for existing fryers 20.

Figure 1B:
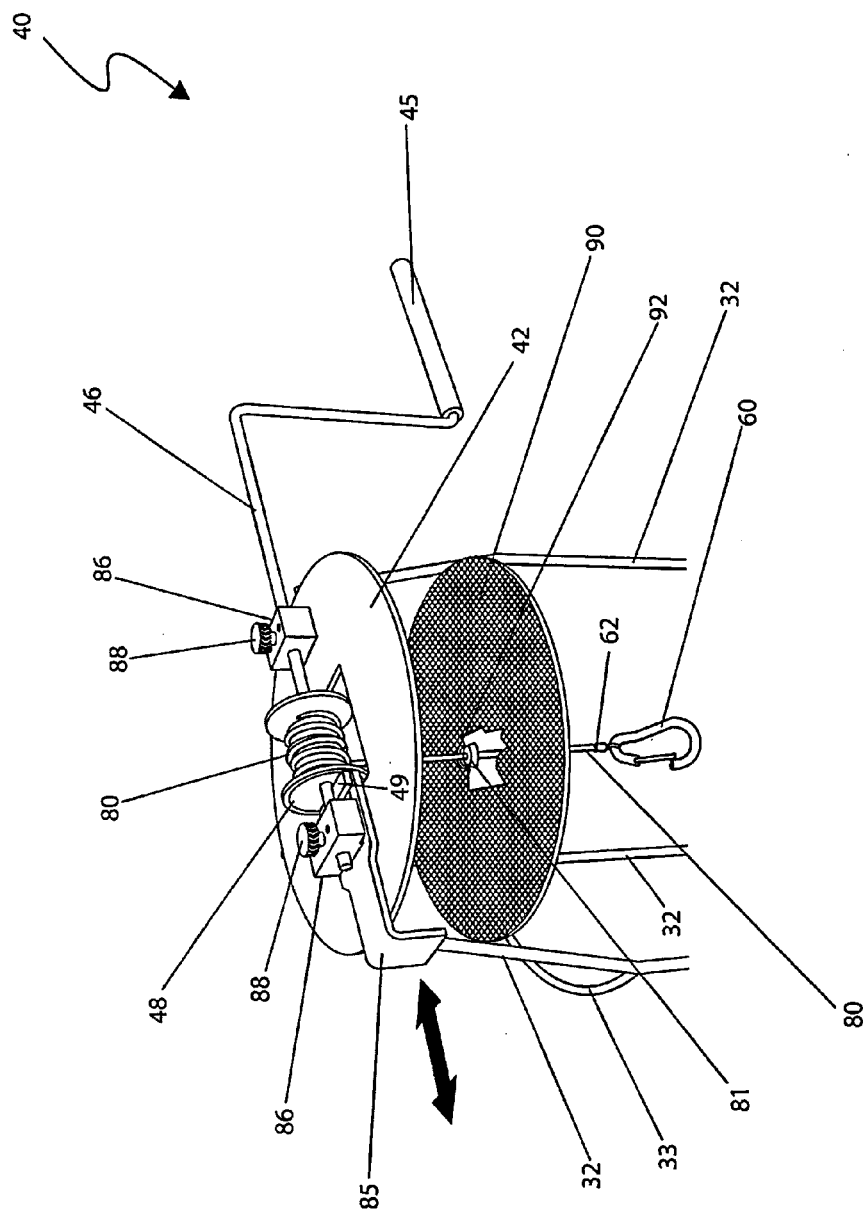
FIG. 1*b* is a perspective view of a winch mechanism 40, according to the preferred embodiment of the present invention.
Figure 2:
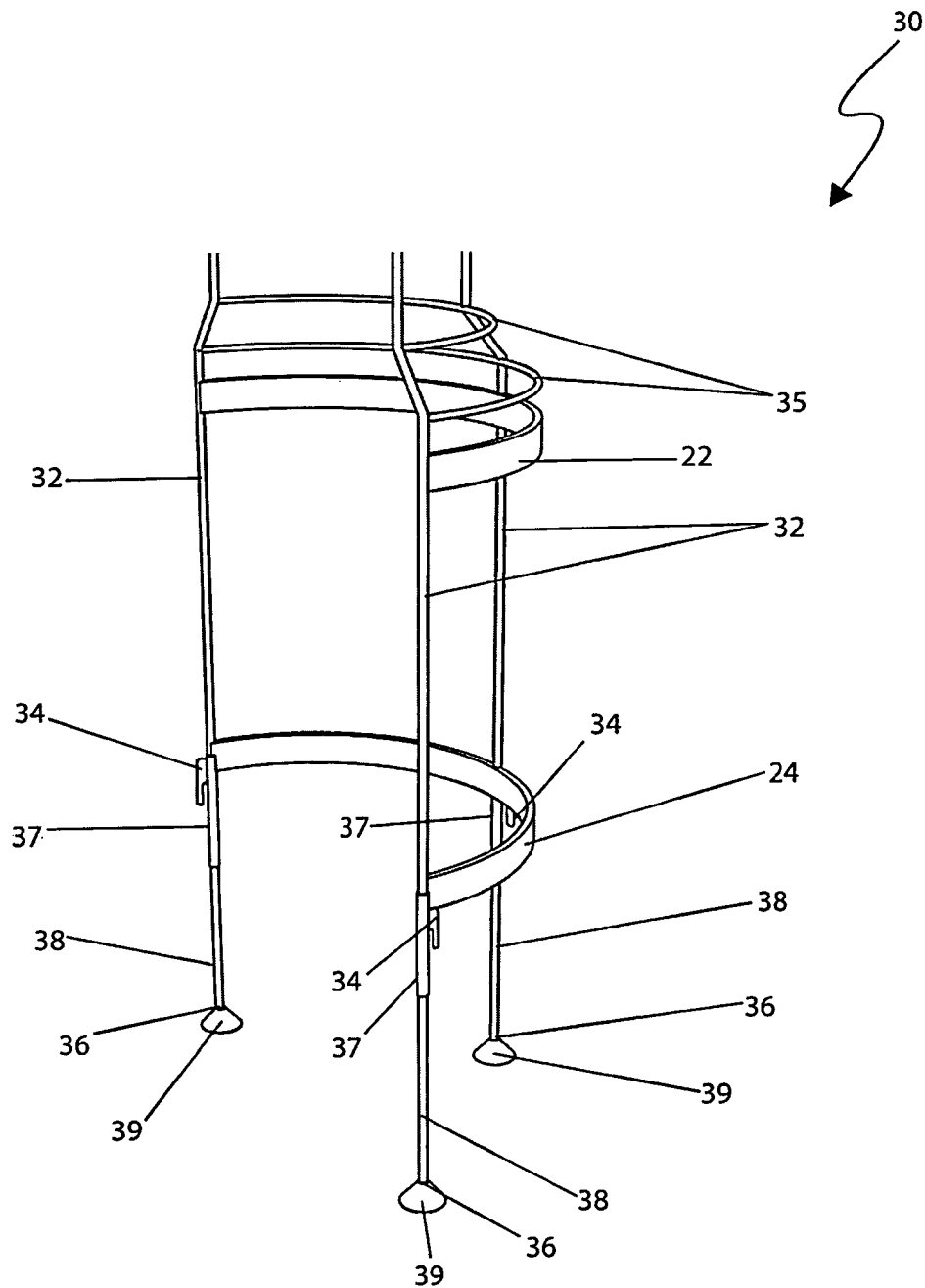
FIG. 2 is a perspective view of a tripod stand portion 30, according to the preferred embodiment of the present invention.

Referring now to FIGS. 1a, 1b, and 2, various views of the apparatus 10, in accordance with the preferred embodiment of the present invention, are disclosed. The apparatus 10 comprises a tripod stand system 30, a guide 90, and a winch mechanism 40. The tripod stand system 30 provides an adjustable stabilizing means thereto said apparatus 10 over a desired fryer 20. The tripod stand 30 comprises three (3) leg assemblies 32 interconnected therewith a plurality of horizontal connecting bars which provide a strengthening means. Said connecting bars include an upper stiffener bar 22 and a lower stiffener bar 24, being positioned and affixed thereto said tripod stand 30 therealong a lower, wider portion of said tripod stand 30. Additional strengthening connecting bars comprise an upper connecting bar 33, and a pair of intermediate connecting bars 35 affixed and arranged along an upper narrower section of said tripod stand 30 as seen here. Said connecting bars 22, 24, 33, 35 are affixed thereto said leg assemblies 32 using common metal joining processes such as welding or soldering. Each leg assembly 32 extends relatively downward in a vertical fashion to contact the ground surface. The leg assemblies 32 are spaced approximately every one hundred ten degrees (110°) therefrom one another in a stabilizing fashion so as to substantially surround a fryer 20 and ultimately allow the connecting bars 33, 35 to partially envelope and secure the fryer 20 therewithin. Said leg assemblies 32 define a cylindrical inner space comprising a diameter being slightly larger than that of the fryer 20, thereby providing containment and secure entrapment thereof. The leg assemblies 32 support the apparatus 10 before, during, and after securing a provision 50 to be fried. The leg assemblies 32 comprise a framework being made of metal round-stock having a diameter sizable to accommodate and stabilize a weight of the apparatus 10 and the provision 50 to be fried. The tripod stand 30 is designed to provide strength and a rigid structure for provisions 50 to be loaded and lowered, thereby applying a heavy weight thereagainst the leg assemblies 32 and the semicircular bars 35 and therefore resisting skewing under such loads. Furthermore, the connecting bars 35 provide enhanced stiffness, thus resisting structural deflection therefrom a weight of the provisions 50 loaded thereupon. The upper portion of the leg assemblies 32 each converge inwardly therearound a guide 90 being affixed thereto a cable 80 and extending downwardly therethrough a winch support plate 42 mounted thereto the leg assemblies 32 at an uppermost point using common metal joining processes. The guide 90 is envisioned to be a flat circular disc comprising a center aperture 92 therein allowing a steel cable 80 to slidingly travel therethrough. The guide 90 also provides a splash guard function and is made using a metal screen material, thereby preventing hot frying oil from splashing or spraying upwardly. As a basket 65 or hook 60 supporting said provisions 50 is raised and lowered (see FIGS. 5*a* and 5*b*), said hook 60 and/or basket 65 is horizontally guided by the guide 90 therewithin the leg assembly 32, thereby preventing the basket 65 or hook 60 from rocking, swinging, or motioning undesirably. In this manner, the provision 50, when placed therewithin the basket 65 or secured thereon the hook 60, will be completely stabilized during the lowering or raising motion thereinto the oil contained therein the fryer 20. The winch mechanism 40 functions as a means to raise and lower the hook 60 and/or basket 65 relative to the fryer 20. The winch 40 comprises a rotating bar 46 therewithin a winch mechanism housing 43 further comprising a handle 45 attached thereto (see FIG. 4). The rotating bar 46 comprises a "Z"-shaped cranking member, thereby providing an efficient manual torque means thereto an internal pulley 48 and cable 80 attached thereto for manual raising and/or lifting of the provision 50. One (1) end of the steel cable 80 is connected thereto the barrel portion of the pulley 48 in a conventional manner, and at an opposite end, thereto a hook 60 via a common crimp-type cable fastener 62 which provides support thereto said provisions 50. The winch mechanism 40 also comprises a winch locking mechanism 85 further comprising a horizontally sliding "L"-shaped metal plate which allows a user to manually secure a vertical incremental positioning of the provision 50 (see FIG. 4). The handle 45 comprises a tube-shaped grasping means having an ergonomically designed shape and diameter, and may be selectively rotated to subsequently position said provision 50 thereto a raised, a lowered, or a plurality of incremental intermediate positions therebetween in conjunction therewith the winch locking mechanism 85. The cable 80 comprises a length of standard braded wire rope having a vertically adjustable stop collar 81 being affixed thereto using a common clamping fastener such as a set screw or the like. The stop collar 81 is positioned such that the aforementioned guide 90 rests thereupon. The cable 80 freely moves upwardly and/or downwardly to a plurality of positions while the user influences the handle 45, and consequently, the rotating bar 46. As the cable 80 is lowered, the guide 90 would contact the top rim of the fryer 20 in a coincidental manner as the provision 50 enters hot oil therewithin the fryer 20. As the cable 80 continues to lower, said cable 80 is envisioned to move slidingly therethrough the aperture portion 92 of the guide 90 until said provision 50 is sufficiently submerged in the hot oil. The multi-position functionality of the steel cable 80 is dependent on the winch mechanism 40, the amount of rotations of the handle 45, and the selected stop position determined by the winch locking mechanism 85.

Figure 3:
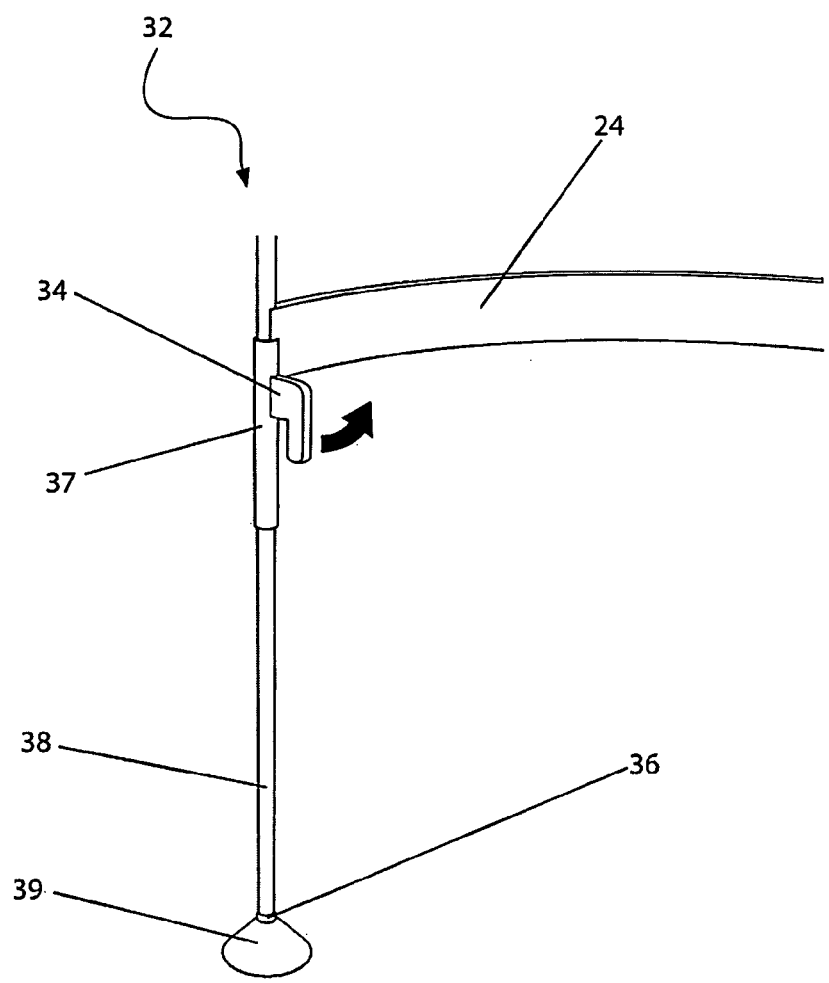
FIG. 3 is a close-up view of a leg assembly 32, according to the preferred embodiment of the present invention.

Referring now to FIG. 3, a close-up view of a leg assembly 32, in accordance with the preferred embodiment of the present invention, is disclosed. Each leg assembly 32 features an adjustability means that allows for selectable upward or downward movement to regulate with a height of the fryer 20, the type of provision 50 to be fried, and/or other user preferences. Each leg assembly 32 comprises a base section 37 and an extendable section 38. Said sections 37, 38 comprise two (2) telescopically extendable members, the diameter of the base section 37 being slightly larger than that of the diameter of the extendable section 38. The extendable section 38 inserts within one (1) end of the base section 37 to extend downwardly at a distal end. The sections 37, 38 are interconnected so that they form a substantial single unit that may be extended for a longer length or retracted for a shorter length. The extendable section 38 comprises a stabilizing foot 39 being connected at a proximal end of said extended section 38. When the leg assemblies 32 are in the extended state, said leg assemblies 32 enable the apparatus 10 to stand securely thereupon a surface of varying grades. Each leg assembly 32 provides a plurality of vertical lengths, thereby corresponding thereto a length for various fryers 20, provision 50 loads, and/or other user preferences. Each vertical stop position of the leg assembly 32 is provided via a leg locking mechanism 34 envisioned to provide intermediate orientation as well as the fully extended and fully retracted states. The leg locking mechanism 34 comprises a common tubular clamping collar similar to those utilized thereupon conventional photographic tripods and tent poles and further comprising an extending quarter-turn lever. The extendable sections 38 may selectively slide to lengthen and/or shorten a retracted, extended, or a plurality of incremental intermediate orientations therebetween. The extendable sections 38 freely move upwardly and/or downwardly to a plurality of positions while the user influences said extendable sections 38 whilst the leg locking mechanism 34 is in the unlocked orientation. The multi-length functionality of the adjustable leg assemblies 32 is dependent on a desired stop length determined by the user. The leg locking mechanism 34 is utilized to control the availability of an overall length of said leg assemblies 32. For example, while the leg locking mechanism 34 is in the unlocked orientation, the leg assembly 32 may extend, retract, and/or motion in intermediate positions therebetween, based solely on which way the leg assembly 32 is being influenced by the user; when the leg locking mechanism 34 is locked into position, the leg assembly 32 remains at that position. Thus, the extendable section 38 would slidably move upward and downward until a desirable position is acquired and affixed into position, thus providing the leg assemblies 32 at a desirable length. It will be appreciated that other lock-stop position acquiring means may also be used without intervening with the scope of the apparatus 10. Each leg assembly 32 is envisioned to comprise an attachable stabilizing foot 39 via a common threaded attachment 36 for improved stability of the apparatus 10 on grounds of various grades. Each stabilizing foot 39 is envisioned to be removably attached thereto the proximal end of each extending section 38 via said threaded attachment 36. The stabilizing foot 39 comprises a common orbital footpad feature motioning thereabout a longitudinal axis of each leg assembly 32, thereby providing compliancy thereto a variety of ground surfaces so that each foot 39 remains in engagement therewith the ground in a readily stable stance being capable of resisting overturning forces. Each stabilizing foot 39 further comprises a high-friction bottom surface made using materials such as, but not limited to: an elastomeric material, knurled or corrugated surface texture, hard rubber, or the like.

Figure 4:
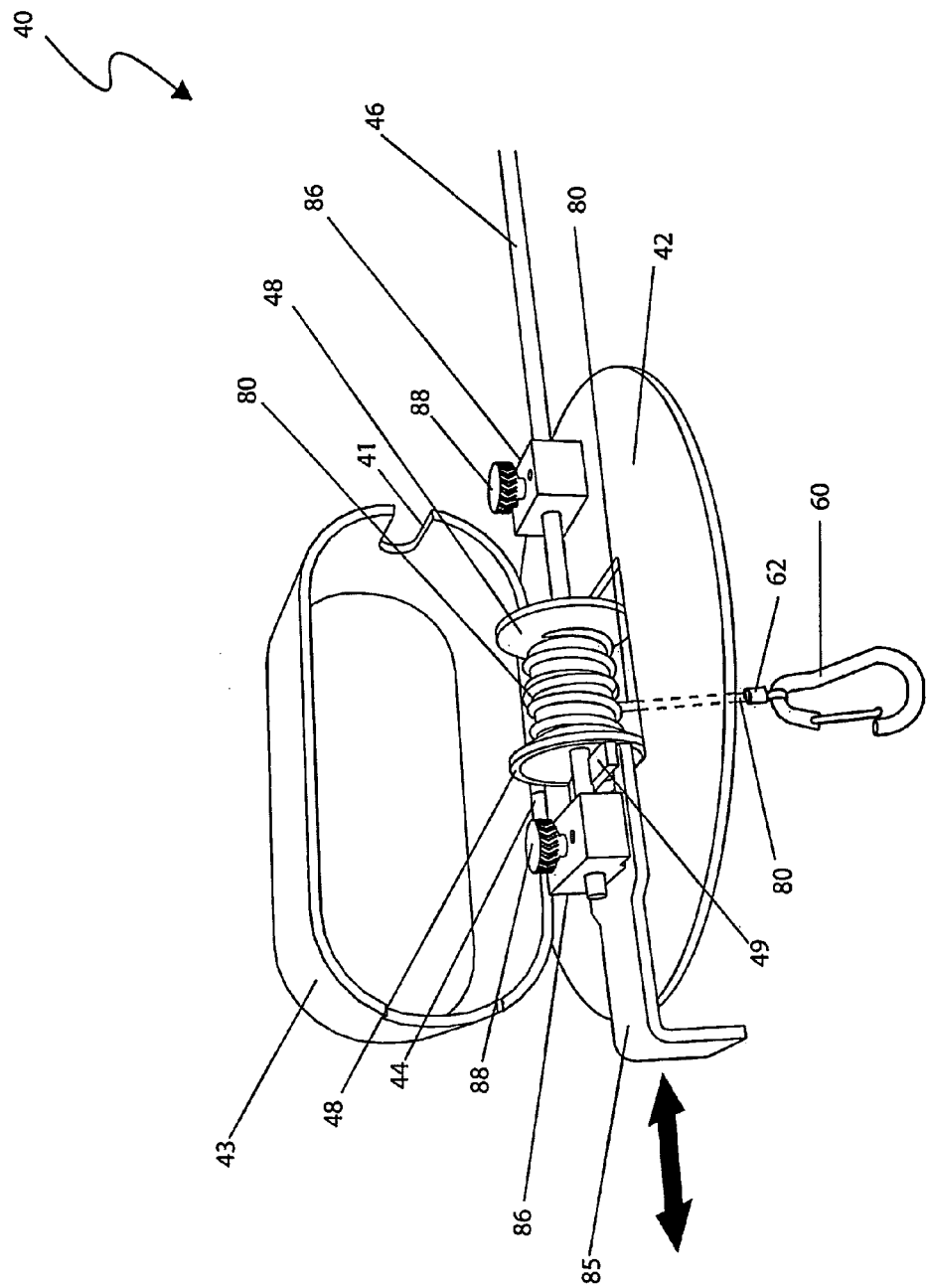
FIG. 4 is a close-up perspective view of the winch mechanism 40, according to the preferred embodiment of the present invention.

Referring now to FIGS. 4, 5*a*, and 5*b*, views of the winch mechanism 40, the basket portion 65, and the hook portion 60, in accordance with the preferred embodiment of the present invention, are disclosed. The winch mechanism 40 functions as a means to raise and lower the hook 60 and/or basket 65 relative to the fryer 20. The winch 40 is mounted thereto a support plate 42 via a pair of locking blocks 86 using common fasteners and is subsequently enclosed therewithin a winch mechanism housing 43. The support plate 42 comprises a rugged circular metal plate providing an attachment means thereto a top portion of the three (3) leg assemblies 32 using common metal joining processes such as welding or soldering. The winch mechanism housing 43 comprises a protective plastic or metal open-bottom, oval-shaped enclosure being held in position via a common axle-type hinge 44. The winch mechanism housing 43 comprises a bar aperture 41 permitting the routing of the rotating bar 46 therethrough. The rotating bar portion 46 of the winch mechanism 40 comprises a pair of locking blocks 86 and corresponding locking knobs 88. Each locking block 86 and corresponding knurled locking knob 88 is capable of bearing a friction means thereupon said rotating bar 46, thereby providing an additional locking means thereto, or a rotational resistance thereto said bar 46, thereby providing improved rotational control. The winch locking mechanism 85 may be utilized to control the availability of a raising or lowering motion of the cable 80 and attached hook 60. The winch locking mechanism 85 further comprises a horizontally sliding "L"-shaped metal plate which mechanically interferes therewith rotation of the pulley 48 at a distal end via an integral stop block 49. The locking mechanism 85 subsequently extends outwardly thereto a perimeter region of the support plate 42 being angled downwardly at a proximal end portion for easy manual engagement and disengagement of said locking mechanism 85 thereagainst said stop block 49. The stop block 49 comprises a length of one (1) inch wide metal flat stock being welded laterally therealong an end portion at an equatorial position thereupon said pulley 48, thereby providing a parallel mechanical stopping means therewith said stop block 49. The winch locking mechanism 85 may be inserted thereagainst said stop block 49 in a parallel manner at each half revolution of the pulley 48, thereby halting a rotary motion thereof. Insertion of said locking mechanism 85 provides a plurality of vertical stop positions such that the provisions 50 may be adjustably positioned thereat fully raised position, a fully lowered position, and at a plurality of intermediate stop positions therebetween. For example, the user may lower the hook 60 and/or basket 65 into a fryer 20; slide the winch locking mechanism 85 outwardly; raise the hook 60 and/or basket 65 thereto a desired position; sliding the winch locking mechanism 85 inwardly, thereby securing the hook 60 and/or basket 65 at that position. The steel cable 80 lowers the provision 50 therein a fryer 20 that is normally formed having a chamber which comprises frying oil or the like. The provision 50 to be fried are envisioned to be attached thereto the steel cable 80 via a hook 60 and/or a basket 65, wherein said hook 60 and/or basket 65 is envisioned to be capable of retaining a large quantity of provision 50. The steel cable 80, basket 65, and hook 60 are envisioned to be fabricated and designed to ensure that sufficient strength is provided to support an anticipated amount of weight. The basket 65 comprises a cylindrical shape mesh container further comprising a basket frame 66, a top wall 67, a bottom mesh wall 68, a cylindrical side wall 69, an eyelet 70, a hasp 72, and a hasp receiver 74. The basket frame 66 comprises a pair of parallel circular metal hoops fabricated using metal flat stock stainless steel or aluminum and positioned and affixed along upper and lower perimeter edges of said basket side walls 69. Said basket frame 66 provides an attachment means thereto the bottom mesh wall 68 and side wall 69 using common metal joining processes such as welding or soldering. The bottom mesh wall 68 and cylindrical side wall 69 comprise an open mesh screen or a plurality of welded wire members arranged in a crisscross configuration which define an inner volume being slightly less than an inner volume and diameter of a fryer 20. The top wall 67 comprises a shallow cylindrical lid structure formed using metal sheet materials and being hingedly and releasably locked thereto the basket frame 66. The top wall 67 comprises a hinge 71, a hasp 72, and a hasp receiver 74. The hasp 72 comprises a standard hardware item being affixed thereto said top wall 67 along a perimeter area opposite a hinging means using common fasteners and comprising a sliding engagement bolt. The hasp 72 is envisioned being made using like materials as the basket frame 66. The top wall 67 further comprises a centrally located eyelet 70 affixed thereto and providing an attachment means thereto the hook 60. The eyelet 70 comprises a common hardware device having a bolt-like attachment means and an inside diameter so as to engagingly receive the hook 60 therethrough. In use, the desired provisions 50 are inserted therewithin the basket 65; secured therein by securing the hasp 72 therein the hasp receiver 74; and engaged and supported using the hook 60. The hook 60 is envisioned to be similar in function and design to a large carabiner providing a spring closure feature.

Referring now to FIG. 6a, a close-up perspective view of an alternate motorized winch mechanism 100, in accordance with an alternate embodiment of the present invention, is disclosed. The motorized winch mechanism 100 provides an operator of the apparatus 10 to initiate a lifting or lowering of the provisions 50 while standing at an increased distance therefrom the fryer 20, thereby improving safety during use. The motorized winch mechanism 100 is envisioned to be of a similar construction as the previously described manual winch operated apparatus 10; however it alternately comprises a stationarily mounted 110-volt motor 102 and a motor shaft 103 in lieu of the rotating bar portion 46. The motorized winch mechanism 100 further comprises a removably detachable power cord 104, a male connector 106, a female connector 107, and an UP/DOWN switch 108. The motor 102 provides a raising and lowering means thereto the cable 80 by activating the UP/DOWN switch 108, thus applying a torque thereto the motor shaft 103, which in-turn causes the steel cable 80 to be gathered or released thereon the pulley 48 as previously described. The motor 102 comprises a standard single-shaft unit with integral gear reduction and horizontal mounting features. The motor 102 also provides sufficient output torque and horsepower to lift the provisions 50, the hook 60, and the basket 65. After the hook 60 and basket 65 are at a desired position such as lowered thereinto the fryer 20, raised thereto an unloading height, or at any desired incremental intermediate elevation therebetween, the winch locking mechanism 85 may be utilized to secure said provisions 50 as previously described (see FIG. 4).

Referring now to FIG. 6b, an electrical block diagram of the alternate motorized winch mechanism 100, according to an alternate embodiment of the present invention, is disclosed. The alternate motorized winch mechanism 100 comprises a 110-volt AC circuit receiving 110-volt AC power therefrom a power cord 104 utilizing available power therefrom an available duplex electrical outlet. Said power cord 104 provides a removably detachable means therefrom the motor 102 via interconnecting a male connector 106 therewith a female connector 107 and an in-line UP/DOWN switch 108 being mounted therealong said power cord 104 at a safe distance therefrom the fryer 20 thereupon attachment. The UP/DOWN switch 108 provides a reversing means thereto a current applied thereto said motor 102, thereby allowing UP and DOWN motions of the provision 50. The UP/DOWN switch 108 comprises a double-pole double-throw (DPDT) reversing AC switch having a three-position toggle control providing a center return position to halt power thereto the motor 102 upon being released by a user. The UP/DOWN switch 108 further comprises a common plastic molded housing and provides a sufficient current rating so as to safely provide power thereto the motor 102 while in a loaded state.

The preferred embodiment of the apparatus 10 can be utilized by the common user in a simple and effortless manner with little or no training. The apparatus 10 describes a means by which a person can fry turkey, chicken, or similar food provisions 50 in an efficient manner while reducing a risk of hot frying oil being splatter thereonto oneself.

After initial purchase or acquisition of the apparatus 10, it would be configured in terms of the preferred embodiment 10 as indicated in FIG. 1a, and in terms of an alternate embodiment 100 as indicated in FIG. 6a.

The method of utilizing the apparatus 10 may be achieved by performing the following steps: positioning the apparatus 10 thereupon a preferably flat surface or smooth grade; adjustably extending and/or retracting the extendable section portions 38 of the leg assemblies 32 in such a manner that the winch mechanism 40 may be operably placed a certain distance above a desired fryer 20; locking the leg assemblies 32 at the desirable height via the leg locking mechanisms 34; placing the apparatus 10 around the desired fryer 20 with the connecting bars 35 and/or the leg assemblies 32 partially enveloping said fryer 20; securing said provision 50 therewithin the basket 65, if desired; mounting said basket 65, if desired, thereto the hook portion 60 to operably secure the desired provision 50; alternately securing said provision 50 directly thereto the hook 60, if desired; hingedly closing the top wall 67 of the basket 65 and securing therewith the hasp 72, thereby fully enclosing the provision 50 therein; disengaging the winch locking mechanism 85 to releasably secure the provision 50; gripping the handle 45 portion of the rotating bar 46; motioning said handle 45 in a rotating manner so as to lower the suspended provision 50 thereinto a frying pot 20; securing a desired elevation of the provision 50 by manually inserting the winch locking mechanism 85 thereagainst the stop block 49; commencing to perform a frying process for an appropriate time interval; once finished frying said provision 50, removing the basket 65 and contents therein by releasing the winch locking mechanism 85; rotating the handle 45 in an opposite direction, thereby raising the basket 65 and the contents therein; engaging the winch locking mechanism 85 thereat a fully raised position; and, hingedly opening the top wall 67 of said basket 65 to allow the provision 50 therein to be able to be collected for consumption or processing.

The apparatus 10 is supported around a periphery of a fryer 20 with vertically adjustable leg assemblies 32 interconnected via connecting bars 35. When it is so desired to lower an unfried provision 50 thereinto the cooking oil, a user may then grasp the handle 45 and rotate the rotating bar 46 in a manner so as to extend the hook 60 and/or basket 65 downwardly until fully disposing thereinto the hot oil therewithin the fryer 20 at which point the rotating bar 46 and pulley 48 will be locked into position using the winch locking mechanism 85. Upon completion of said frying process and lifting of the provision 50 therefrom the hot oil, the wire frame or meshed properties of the basket 65 enable effective draining of residual cooking oil while retaining the provision 50 therein.

The apparatus 10 is envisioned to be utilized for frying provision 50 so as to provide a means of convenience and safety thereto the user, i.e. eliminating the possibility of hot oil being projected thereonto a user whilst the provision 50 is being inserted therein said oil; being removed therefrom said oil; and/or whilst the frying process is taking place. The apparatus 10 permits a user to lower and raise provision 50 therein a fryer 20 with minimal amount of work and/or handling, while keeping the user at a safe distance therefrom associated hazards. Furthermore, the guide 90 provides safe and controlled lowering and raising of the basket 65 by providing a guarding means to contain and/or deflect hot frying oil from splattering undesirably upward.

It is understood that the apparatus 10 is to be introduced in various sizes such as small, medium, and large, thereby allowing frying of various provision 50 such as, but not limited to: small frying jobs such as chicken wings and fries, as well as large frying jobs such as one (1) or more turkeys and/or chickens. A medium size apparatus 10 is also envisioned for most home frying applications.

The method of utilizing the alternate motorized embodiment 100 may be achieved by performing the following additional steps: connecting the female connector portion 107 of the power cord 104 thereto the male connector portion 106 of the motor 102; supplying electric power thereto the motorized winch mechanism 100 by plugging the power cord 104 thereinto an available electric outlet; initiating the motorized winch mechanism 100 using the UP/DOWN switch 108; operating the motorized winch mechanism 100 in conjunction therewith the winch locking mechanism 85 as described above; manipulating the hook 60 and/or basket 65 to lift, lower, or retain an intermediate vertical position thereof using said UP/DOWN switch 108 and motor 102.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An apparatus for providing a raising and lowering means for a load into a cooking vessel, further comprising:
   a vertically adjustable stand;
   a winch mechanism affixed thereto a upper portion thereof said stand;
   a cable comprising a lower end and an upper end affixed thereto said winch mechanism; and,
   a hook attached thereto said lower end thereof said cable;
   wherein said vertically adjustable stand defines a cylindrical inner space comprising a diameter being slightly larger than that of said cooking vessel, thereby providing containment and secure entrapment thereof said cooking vessel;
   wherein said vertically adjustable stand contacts a ground surface;
   wherein said winch mechanism provides said raising and lowering means therefor said load wherein said winch mechanism further comprises:
   a winch mounting plate mounted thereto a terminal upper end thereof said leg assemblies for supporting said winch mechanism, said winch mounting plate comprising a cable aperture for permitting the routing of a cable therethrough;

a pulley comprising an attachment means therefor said upper end thereof said cable and positioned thereabove said cable aperture;

a rotating bar affixed thereto said winch mounting plate thereby a first locking block and a second locking block on opposing sides thereof said cable aperture and further comprising a handle on a first end and a cranking member extending therefrom said handle and routed therethrough and mechanically engaging said pulley; and, a winch locking mechanism slidably mounted thereto said winch mounting plate wherein said second locking block is mounted thereon and further comprising a plate with a stop block mounted thereon a distal upper end and a grasping portion located at a proximal end thereof;

wherein said rotating bar provides a rotating means thereto said pulley;

wherein said pulley provides an incremental reeling means thereby reeling in and paying out said cable;

wherein said reeling means provides said raising and lowering means;

wherein said winch locking mechanism mechanically interferes therewith said pulley when said stop block is positioned thereagainst;

wherein said winch locking mechanism provides an incremental vertical cable securing means, thereby providing a control of a vertical position thereof a load thereon said hook; and, wherein said grasping portion thereof said winch locking mechanism extends outwardly thereto a perimeter region of said winch mounting plate and angled downwardly to provide easy engagement thereof said vertical cable securing means.

2. The apparatus of claim 1, wherein said vertically adjustable stand further comprises:

a tripod stand assembly, further comprising;

three adjustable leg assemblies comprising a lower portion and an upper portion converging inwardly therefrom said lower portion;

a plurality of connecting bars affixed thereto and interconnecting said leg assemblies; and, a plurality of attachable stabilizing feet each attachable thereto each of a terminal lower end thereof said leg assemblies;

wherein said tripod stand provides strength and a rigid structure for said apparatus and said load during said raising and lowering means, thereby applying a heavy weight thereagainst for resisting an unintended skewing or collapsing motion;

wherein said connecting bars provide a strengthening means thereto said tripod stand assembly; and, wherein each said stabilizing foot provides an improved stability of said apparatus on ground surfaces of various grades.

3. The apparatus of claim 2, wherein said leg assemblies each comprise an adjustability means further comprising:

a base section;

an extendable section slidably engaged therein said base section; and, a leg locking mechanism for securing said extendable section thereto said base section thereat a desired position;

wherein said base section and said extendable section are interconnected to form a single unit;

wherein said stabilizing foot is removably attachable thereto a proximal end thereof said extendable section;

wherein said adjustability means allows for selectable upward or downward movement to regulate said apparatus therewith a height of said cooking vessel; and, wherein said adjustability means provides an incremental adjustment therefor said desired position between a fully extended state to a fully retracted state.

4. The apparatus of claim 3, wherein said leg locking mechanism further comprises a common tubular clamping collar and further comprising an extending quarter-turn lever.

5. The apparatus of claim 4, wherein said leg assemblies comprise a framework being made of metal round-stock having a diameter sizable to accommodate and stabilize a weight of said apparatus and said load.

6. The apparatus of claim 5, wherein said leg assemblies are spaced approximately every one hundred ten degrees therefrom one another in a stabilizing fashion.

7. The apparatus of claim 2, wherein said connecting bars further comprise:

a lower stiffener bar affixed thereat and interconnecting a lower location of said lower portion of said leg assemblies;

an upper stiffener bar affixed thereat and interconnecting an upper location of said lower portion of said leg assemblies;

a pair of intermediate connector bars affixed thereat and interconnecting a lower location of said upper portion of said leg assemblies; and, an upper connecting bar affixed thereat and interconnecting an upper location of said upper portion of said leg assemblies;

wherein said plurality of connecting bars each provide enhanced stiffness, thereby resisting structural deflection therefrom a weight of said load thereon said apparatus.

8. The apparatus of claim 2, wherein said stabilizing feet further comprises an orbital footpad feature motioning thereabout a longitudinal axis of each leg assembly.

9. The apparatus of claim 8, wherein said stabilizing feet further comprises a high-friction bottom surface.

10. The apparatus of claim 1, wherein said first locking block comprises a first locking knob and said second locking block comprises a second locking knob;

wherein said first locking knob and said second locking knob each provides a rotational restriction means thereto said rotating bar thereby providing improved rotational control.

11. The apparatus of claim 10, further comprising a winch mechanism housing comprising a protective open-bottom enclosure being held in position via a common axle-type hinge attachable thereto said winch mounting plate and further comprising a bar aperture permitting the routing thereof said rotating bar therethrough.

12. The apparatus of claim 11, wherein said cable further comprises:

a length of cable with said upper end affixed thereto said pulley;

a stop collar adjustably attached thereto said cable;

a guide comprising a flat circular disc resting thereupon said stop collar and a center aperture thereof allowing said cable to slidingly travel therethrough; and, a cable fastener located at said lower end for attaching said hook thereto;

wherein said load is supported thereby said hook;

wherein said guide prevents said cable from an undesirable motion when said foodstuffs are supported thereby said apparatus and during said raising and lowering means;

wherein said guide contacts an upper portion thereof said cooking vessel when said cable is lowered;

wherein said cable slidingly moves therethrough said guide in order to introduce said load therein said cooking vessel thereto a desired position; and, wherein said guide provides a splash guard function, thereby preventing contents within said cooking vessel from splashing or spraying upwardly.

13. The apparatus of claim 12, further comprising a basket removably attached thereto said hook, further comprising:
   a cylindrical mesh container further comprising an upper frame and a lower frame supporting a bottom mesh wall and a side mesh wall;
   a lid hingedly attached thereto said upper frame;
   a hasp for securing said lid thereto said container; and,
   an eyelet centrally attached thereto said lid and extending upwardly for removably attaching said basket thereto said hook and positioned and affixed along upper and lower perimeter edges of said basket side walls;
   wherein said diameter thereof said basket allows said basket to be easily inserted therein said cooking vessel;
   wherein said load is inserted therein said basket and secured therein said lid and said hasp.

14. The apparatus of claim 13, wherein said hook is a carabiner.

15. The apparatus of claim 14, wherein said guard is a metal screen material.

16. The apparatus of claim 15, wherein said stand is fabricated with a resilient and lightweight metallic material.

17. The apparatus of claim 1, wherein said winch mechanism further comprises:
   a winch mounting plate mounted thereto a terminal upper end thereof said leg assemblies for supporting said winch mechanism, said winch mounting plate comprising a cable aperture for permitting the routing of a cable therethrough;
   a pulley comprising an attachment means therefor said upper end thereof said cable and positioned thereabove said cable aperture;
   a winch locking mechanism slidably mounted thereto said winch mounting plate wherein a locking block is mounted thereon and further comprising a plate with a stop block mounted thereon a distal upper end and a grasping portion located at a proximal end thereof;
   a motor mounted thereto said winch mounting plate adjacent thereto said cable aperture;
   a motor shaft rotatably driven thereby said motor at a first end and attached thereto a locking block mounted thereto said winch mounting plate on an opposing side thereof said cable aperture;
   a power cord removably attachable thereto said motor for providing electrical power thereto; and,
   a control switch in electrical communication therewith and comprising a controlling means therefor said motor;
   wherein said control switch controls power thereto said motor;
   wherein said motor provides a sufficient torque and horsepower thereto said apparatus to provide said raising and lowering means;
   wherein said motor drives said motor shaft when receiving said power;
   wherein said motor shaft provides a rotating means thereto said pulley;
   wherein said pulley provides an incremental reeling means thereby reeling in and paying out said cable;
   wherein said reeling means provides said raising and lowering means;
   wherein said winch locking mechanism mechanically interferes therewith said pulley when said stop block is positioned thereagainst;
   wherein said winch locking mechanism provides an incremental vertical cable securing means, thereby providing a control of a vertical position thereof a load thereon said hook; and,
   wherein said grasping portion thereof said winch locking mechanism extends outwardly thereto a perimeter region of said winch mounting plate and angled downwardly to provide easy engagement thereof said vertical cable securing means;
   wherein said winch mechanism allows a user to operate said winch from a safe distance therefrom said apparatus and said cooking vessel.

18. The apparatus of claim 17, wherein said control switch further comprises an "UP" button providing a vertical raising means and a "DOWN" button for providing a vertical lowering means.

19. The apparatus of claim 18, wherein said locking block comprises a locking knob;
   wherein said locking knob provides a rotational restriction means thereto said motor shaft, thereby providing improved rotational control.

20. The apparatus of claim 19, further comprising a winch mechanism housing comprising a protective open-bottom enclosure being held in position via a common axle-type hinge attachable thereto said winch mounting plate and further comprising a bar aperture permitting the routing thereof said rotating bar therethrough.

21. The apparatus of claim 20, wherein said cable further comprises:
   a length of cable with said upper end affixed thereto said pulley;
   a stop collar adjustably attached thereto said cable;
   a guide comprising a flat circular disc resting thereupon said stop collar and a center aperture thereof allowing said cable to slidingly travel therethrough; and,
   a cable fastener located at said lower end for attaching said hook thereto;
   wherein said load is supported thereby said hook;
   wherein said guide prevents said cable from an undesirable motion when said foodstuffs are supported thereby said apparatus and during said raising and lowering means;
   wherein said guide contacts an upper portion thereof said cooking vessel when said cable is lowered;
   wherein said cable slidingly moves therethrough said guide in order to introduce said load therein said cooking vessel thereto a desired position; and,
   wherein said guide provides a splash guard function, thereby preventing contents within said cooking vessel from splashing or spraying upwardly.

22. The apparatus of claim 21, further comprising a basket removably attached thereto said hook, further comprising:
   a cylindrical mesh container further comprising an upper frame and a lower frame supporting a bottom mesh wall and a side mesh wall;
   a lid hingedly attached thereto said upper frame;
   a hasp for securing said lid thereto said container; and,
   an eyelet centrally attached thereto said lid and extending upwardly for removably attaching said basket thereto said hook and positioned and affixed along upper and lower perimeter edges of said basket side walls;
   wherein said diameter thereof said basket allows said basket to be easily inserted therein said cooking vessel;
   wherein said load is inserted therein said basket and secured therein said lid and said hasp.

23. The apparatus of claim 22, wherein said hook is a carabiner.

24. The apparatus of claim 23, wherein said guard is a metal screen material.

25. The apparatus of claim 24, wherein said stand is fabricated with a resilient and lightweight metallic material.

26. A method for manually raising and lowering a load thereinto a cooking vessel supported thereby a vertically adjustable apparatus comprises the following steps:
providing said apparatus further comprising:
a vertically adjustable stand, further comprising:
three (3) adjustable leg assemblies comprising a lower portion and an upper portion converging inwardly therefrom said lower portion;
an adjustability means further comprising a base section, an extendable section slidably engaged therein said base section, a leg locking mechanism further comprising an extending quarter-turn lever for securing said extendable section thereto said base section thereat a desired position;
a lower stiffener bar affixed thereat and interconnecting a lower intermediate location thereof said leg assemblies thereat said lower portion;
an upper stiffener bar affixed thereat and interconnecting an upper intermediate location thereof said leg assemblies thereat said lower portion;
a pair of intermediate connector bars affixed thereat and interconnecting a lower intermediate location thereof said leg assemblies thereat an upper portion;
an upper connecting bar affixed thereat and interconnecting an upper intermediate location thereof said leg assemblies thereat an upper portion; and,
an attachable stabilizing foot attachable thereto each of a terminal lower end thereof said leg assemblies further comprising an orbital footpad feature motioning thereabout a longitudinal axis of each leg assembly and a high-friction bottom surface;
a winch mechanism affixed thereto a upper portion thereof said stand, further comprising:
a winch support plate mounted thereto a terminal upper end thereof said leg assemblies for supporting said winch mechanism, said winch support plate comprising a cable aperture for permitting the routing of a cable therethrough;
a pulley comprising an attachment means therefor said upper end thereof said cable and positioned thereabove said cable aperture;
a rotating bar affixed thereto said winch support plate thereby a first locking block and a second locking block on opposing sides thereof said cable aperture and further comprising a handle on a first end and a cranking member extending therefrom said handle and routed therethrough and mechanically engaging said pulley;
a winch locking mechanism slidably mounted thereto said winch mounting plate wherein said second locking block is mounted thereon and further comprising a plate with a stop block mounted thereon a distal upper end and a grasping portion located at a proximal end thereof;
a first locking knob and a second locking knob each providing a rotational restriction means thereto said rotating bar thereby providing improved rotational control; and,
a winch mechanism housing comprising a protective open-bottom enclosure being held in position via a common axle-type hinge attachable thereto said winch mounting plate and further comprising a bar aperture permitting the routing thereof said rotating bar therethrough;
a length of cable with said upper end affixed thereto said pulley;
a stop collar adjustably attached thereto said cable;
a guide comprising a flat circular disc resting thereupon said stop collar and a center aperture thereof allowing said cable to slidingly travel therethrough; and,
a cable fastener located at said lower end for attaching said hook thereto;
positioning said apparatus thereupon a ground surface;
adjustably extending and/or retracting each said extendable section of said leg assemblies at said desired position said winch mechanism may be operably placed an easily obtainable and operational distance thereabove said cooking vessel;
locking each of said leg assemblies at said desirable position via said leg locking mechanism;
placing said apparatus therearound said cooking vessel such that said lower stiffener bar, said upper stiffener bar, said pair of lower connecting bars, said upper connecting bar, and said leg assemblies partially envelop said cooking vessel;
securing said load thereon said hook;
disengaging said winch locking mechanism, if engaged thereon said pulley, to releasably secure said load thereby grasping said grasping portion and removing said stop block therefrom said pulley, thereby allowing movement thereof;
gripping said handle portion of said rotating bar;
rotating said handle in a first direction so as to lower said load thereinto said cooking vessel, wherein said handle rotates said cranking member, which rotates said pulley and pays out said cable and said load attached thereto said hook;
securing a vertical position of said load by manually inserting said winch locking mechanism thereon said pulley, thereby restricting movement thereof;
commencing to perform a cooking process for said load, wherein said guard prevents any splashing or spraying of contents within said cooking vessel;
once said cooking process is completed, removing said load therefrom said cooking vessel by releasing said winch locking mechanism by grasping said grasping portion and removing said top block therefrom said pulley, rotating said handle in a second direction, thereby rotating said cranking portion, rotating said pulley, and reeling in said cable and said load attached thereto said hook;
engaging said winch locking mechanism thereat a fully raised position; and,
removing said load therefrom said hook for subsequent consumption or processing.

27. The method of claim 26, further comprising the steps of:
placing said load therein a basket, wherein said basket comprises a cylindrical mesh container further comprising an upper frame and a lower frame supporting a bottom mesh wall and a side mesh wall, a lid hingedly attached thereto said upper frame, a hasp for securing said lid thereto said container, and an eyelet centrally attached thereto said lid and extending upwardly for removably attaching said basket thereto said hook and positioned and affixed along upper and lower perimeter edges of said basket side walls;

hingedly closing said lid and securing said lid therewith said hasp, thereby fully enclosing said load therein;

attaching said basket thereto said hook;

removing said load therefrom said basket by unlatching said hasp and hingedly opening said lid, thereby gaining access thereto said load; and, detaching said basket therefrom said hook.

28. A method for raising and lowering a load thereinto a cooking vessel supported thereby a vertically adjustable apparatus comprising an electrically powered raising and lowering means comprises the following steps:

providing said apparatus further comprising:
- a vertically adjustable stand, further comprising:
  - three (3) adjustable leg assemblies comprising a lower portion and an upper portion converging inwardly therefrom said lower portion;
  - an adjustability means further comprising a base section, an extendable section slidably engaged therein said base section, a leg locking mechanism further comprising an extending quarter-turn lever for securing said extendable section thereto said base section thereat a desired position;
  - a lower stiffener bar affixed thereat and interconnecting a lower intermediate location thereof said leg assemblies thereat said lower portion;
  - an upper stiffener bar affixed thereat and interconnecting an upper intermediate location thereof said leg assemblies thereat said lower portion;
  - a pair of intermediate connector bars affixed thereat and interconnecting a lower intermediate location thereof said leg assemblies thereat an upper portion;
  - an upper connecting bar affixed thereat and interconnecting an upper intermediate location thereof said leg assemblies thereat an upper portion; and,
  - an attachable stabilizing foot attachable thereto each of a terminal lower end thereof said leg assemblies further comprising an orbital footpad feature motioning thereabout a longitudinal axis of each leg assembly and a high-friction bottom surface;
- a winch mechanism affixed thereto a upper portion thereof said stand, further comprising:
  - a winch support plate mounted thereto a terminal upper end thereof said leg assemblies for supporting said winch mechanism, said winch support plate comprising a cable aperture for permitting the routing of a cable therethrough;
  - a pulley comprising an attachment means therefor said upper end thereof said cable and positioned thereabove said cable aperture;
  - a winch locking mechanism slidably mounted thereto said winch mounting plate wherein said second locking block is mounted thereon and further comprising a plate with a stop block mounted thereon a distal upper end and a grasping portion located at a proximal end thereof;
  - a motor mounted thereto said winch mounting plate adjacent thereto said cable aperture;
  - a motor shaft rotatably driven thereby said motor at a first end and attached thereto a locking block mounted thereto said winch mounting plate on an opposing side thereof said cable aperture;
  - a power cord removably attachable thereto said motor for providing electrical power thereto; and,
  - a control switch in electrical communication therewith and comprising a controlling means therefor said motor, wherein said control switch further comprises an "UP button providing a vertical raising means and a "DOWN" button for providing a vertical lowering means;
  - a locking knob providing a rotational restriction means thereto said motor shaft, thereby providing improved rotational control; and,
  - a winch mechanism housing comprising a protective open-bottom enclosure being held in position via a common axle-type hinge attachable thereto said winch mounting plate and further comprising a bar aperture permitting the routing thereof said rotating bar therethrough;
  - a length of cable with said upper end affixed thereto said pulley;
  - a stop collar adjustably attached thereto said cable;
  - a guide comprising a flat circular disc resting thereupon said stop collar and a center aperture thereof allowing said cable to slidingly travel therethrough; and,
  - a cable fastener located at said lower end for attaching said hook thereto;

positioning said apparatus thereupon a ground surface;

adjustably extending and/or retracting each said extendable section of said leg assemblies at said desired position said winch mechanism may be operably placed an easily obtainable and operational distance thereabove said cooking vessel;

locking each of said leg assemblies at said desirable position via said leg locking mechanism;

placing said apparatus therearound said cooking vessel such that said lower stiffener bar, said upper stiffener bar, said pair of lower connecting bars, said upper connecting bar, and said leg assemblies partially envelop said cooking vessel;

securing said load thereon said hook;

connecting said power cord thereto said motor;

supplying power thereto said power cord;

disengaging said winch locking mechanism, if engaged thereon said pulley, to releasably secure said load thereby grasping said grasping portion and removing said stop block therefrom said pulley, thereby allowing movement thereof;

initiating said motorized winch mechanism by activating said controlling means therewith said control switch;

depressing said "DOWN" button, thereby activating said controlling means to operate said motor so as to lower said load thereinto said cooking vessel, wherein said motor rotates said motor shaft in a first direction, which rotates said pulley and pays out said cable and said load attached thereto said hook;

securing a vertical position of said load by manually inserting said winch locking mechanism thereon said pulley, thereby restricting movement thereof;

commencing to perform a cooking process for said load, wherein said guard prevents any splashing or spraying of contents within said cooking vessel;

once said cooking process is completed, removing said load therefrom said cooking vessel by releasing said winch locking mechanism by grasping said grasping portion and removing said top block therefrom said pulley, depressing said "UP" button, thereby activating said controlling means to operate said motor so as to raise said load therefrom said cooking vessel, wherein said motor rotates said motor shaft in a second direction, thereby rotating said pulley and reeling in said cable and said load attached thereto said hook;

engaging said winch locking mechanism thereat a fully raised position; and, removing said load therefrom said hook for subsequent consumption or processing.

29. The method of claim 28, further comprising the steps of:

placing said load therein a basket, wherein said basket comprises a cylindrical mesh container further comprising an upper frame and a lower frame supporting a bottom mesh wall and a side mesh wall, a lid hingedly attached thereto said upper frame, a hasp for securing said lid thereto said container, and an eyelet centrally attached thereto said lid and extending upwardly for removably attaching said basket thereto said hook and positioned and affixed along upper and lower perimeter edges of said basket side walls;

hingedly closing said lid and securing said lid therewith said hasp, thereby fully enclosing said load therein;

attaching said basket thereto said hook;

removing said load therefrom said basket by unlatching said hasp and hingedly opening said lid, thereby gaining access thereto said load; and, detaching said basket therefrom said hook.

* * * * *